United States Patent
McGuinness

[11] Patent Number: 5,558,117
[45] Date of Patent: Sep. 24, 1996

[54] PNEUMATIC VALVE ASSEMBLY WITH DYNAMIC ANNULAR SEAL FLANGE

[76] Inventor: Frank J. McGuinness, 7519 Ponce Ave., West Hills, Calif. 91307

[21] Appl. No.: 371,125

[22] Filed: Jan. 11, 1995

[51] Int. Cl.$^6$ .............. B60C 29/04; F16K 7/20; F16K 15/20; F16K 21/00
[52] U.S. Cl. .............. 137/223; 251/320; 251/336; 152/429
[58] Field of Search .............. 152/427, 429; 137/223, 224, 225, 226, 854; 251/82, 318, 319, 320, 335.1, 336

[56] References Cited

U.S. PATENT DOCUMENTS

| | | | |
|---|---|---|---|
| 575,817 | 1/1897 | Veith | 137/223 |
| 597,954 | 1/1898 | Cartwright | 137/854 X |
| 1,247,326 | 11/1917 | Porter | 137/223 |
| 2,088,248 | 7/1937 | Perry | 137/223 |
| 2,103,822 | 12/1937 | Perry | 137/223 |
| 2,160,398 | 5/1939 | Crowley | 137/223 |
| 3,063,462 | 11/1962 | Potash | 137/223 |
| 3,973,588 | 8/1976 | Holst | 137/854 |
| 4,340,080 | 7/1982 | Lefrancois | 137/223 |

FOREIGN PATENT DOCUMENTS

| | | |
|---|---|---|
| 413638 | 5/1946 | Italy . |
| 1101077 | 1/1968 | United Kingdom . |

*Primary Examiner*—Michael W. Ball
*Assistant Examiner*—Francis J. Lorin
*Attorney, Agent, or Firm*—John R. Flanagan

[57] ABSTRACT

A pneumatic valve assembly includes a valve body having an interior outer central passageway and an interior inner central cavity larger in diameter than the outer central passageway, a valve stem disposed within the outer central passageway and extending into the inner central cavity, a retainer member which supports the valve stem, and a flexible bendable annular seal flange attached about the valve stem held against an interior annular seal surface formed within the valve body between the central passageway and central cavity due to the support of the valve stem by the retainer member. Upon inflation, inward flow of pressurized air through an annular channel between the valve body and valve stem impinges on the annular seal flange, causing it to flex away from the annular seal surface and to permit inward flow of pressurized air. A plurality of grooves are spaced circumferentially and extending longitudinally on the valve stem to facilitate even distribution of pressurized air flow on the annular seal flange. Deflation is accomplished by pressing on the outer end of the valve stem, which compresses an inner portion of the valve stem and causes the annular seal flange to move away from the annular seal surface and permit outward flow of pressurized air.

18 Claims, 3 Drawing Sheets

PNEUMATIC VALVE ASSEMBLY WITH DYNAMIC ANNULAR SEAL FLANGE

BACKGROUND OF THE INVENTION

1. Field of the Invention

The present invention generally relates to tire valves and, more particularly is concerned with a pneumatic valve assembly with a dynamic annular seal flange.

2. Description of the Prior Art

Many objects such as automobile, motorcycle, and bicycle tires contain pressurized air. In conjunction with such tires, a pnuematic tire valve is needed which allows the introduction of air, seals pressurized air within the tire, and allows for the release of the pressurized air.

While tire valves currently in use meet the above three requirements, they generally do so with several drawbacks. Tire valves currently in general use consist of a valve stem installed in the rim and a valve unit core which includes six separate pieces. Such tire valves require two air seals, a static seal between the body of the valve unit core and the valve stem in addition to the seal within the valve core which allows for the introduction and release of air. Also, such valve designs incorporate a plunger, an air release pin, and spring. To allow the inward flow of air during inflation, the plunger mechanism must move. All of these several parts result in a tire valve which weighs more than necessary, thus requiring greater wheel balance compensation.

Additionally, such valve designs require precision machining of internal threads in the valve body which is time consuming, costly and reduces valve body strength. Finally, inward air flow during inflation results in oscillation of the valve stem.

Other valve designs have addressed some of the above drawbacks. The devices disclosed in U.S. Pat. No. 1,247,326 to Porter, U.S. Pat. No. 2,088,248 to Perry, U.S. Pat. No. 2,103,822 to Perry, U.S. Pat. No. 2,160,398 to Crowley, and U.S. Pat. No. 4,340,080 to Lefrancois all appear to reduce the number of parts incorporated in the valve and eliminate the static seal, but they continue to incorporate a mechanism which must move to allow air to flow in and then return to its original position to form a seal.

Consequently, a need still exists for a tire valve which reduces the number of parts thereby reducing complexity and weight, which eliminates the need for a static seal and machining of internal threads, eliminates valve stem oscillation during inflation, and incorporates a seal flange that merely deforms or flexes to allow the introduction of air upon inflation then returns to its original shape to seal the air within the tire.

SUMMARY OF THE INVENTION

The present invention provides a pnuematic tire valve assembly designed to satisfy the aforementioned needs by avoiding the drawbacks of the prior art without introducing other drawbacks.

One advantage of the present invention is the reduction of complexity. This advantage results from the utilization of only three parts in the valve assembly of the present invention: a molded valve body, a molded valve stem having a bendable or deformable annular seal flange, and a retainer ring which holds the valve stem in place. The reduced number of parts also reduces the weight of the tire valve assembly thus decreasing the need for wheel balance compensation.

Another advantage of the valve assembly of the present invention is the incorporation of the bendable or deflectable annular seal flange. The bendable seal flange functions as a single dynamic seal providing all sealing requirements for both static and dynamic leak paths eliminating the need for two seals in the tire valve. Air flow during tire inflation does not cause valve stem oscillation, only flexing of the seal flange. The flexible seal flange also reduces the air pressure differential across the seal surface during tire inflation.

A further advantage of the valve assembly of the present invention is the simplification of the process of assembling the three parts together. The valve body is simply placed over the valve stem and the retainer ring inserted to hold the stem in place. The use of adhesives or special preparation of parts is unnecessary and additional operations, such as the machining of threads, are not required on the parts of the invention after ejection from the mold. The absence of internal threads in the present invention also results in increased valve body strength.

Yet another advantage is the ease with which a new valve stem can be installed in the valve body. No special tool is needed for valve stem removal. Needle nose pliers can be used to grip the outward portion of the valve stem and remove it from the valve body. Then, by lightly coating the bottom or inner side of the annular seal flange with petroleum jelly or another suitable lubricant, a new valve stem can be pushed down into the valve body to its proper position. By applying air pressure, the annular seal flange will then migrate to its sealing position.

Besides providing a simple means by which pressurized air is introduced and sealed within a tire, the present invention also incorporates a simple means by which pressurized air may be released through the tire valve assembly. Application of suitable pressure on the outward end of the valve stem causes an inner axial portion of the stem to compress since it is held in place by the retainer ring. As the inner axial portion of the stem compresses, the seal flange moves away from the sealing surface of the valve body forming a passage through which air may escape outward.

In addition to the aforementioned features and advantages, the valve assembly of the present invention incorporates an annular channel between the valve body and stem on the air entry or outer side of the annular seal flange. The annular channel is of sufficient area as to preclude the flow of pressurized air at a high velocity across the seal surface thereby preventing seal lip and surface erosion. The valve assembly of the present invention also incorporates circumferentially-spaced longitudinally-extending grooves on the valve stem to allow for more even distribution of air pressure on the annular seal flange.

Although the valve assembly of the present invention improves upon existing tire valve designs, it is fully interchangeable with existing tire valves. An outer casing of a suitable material, such as butyl rubber, is molded over the lower portion of the valve body, and the assembled unit installs in a wheel rim in the same manner as existing tire valves.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
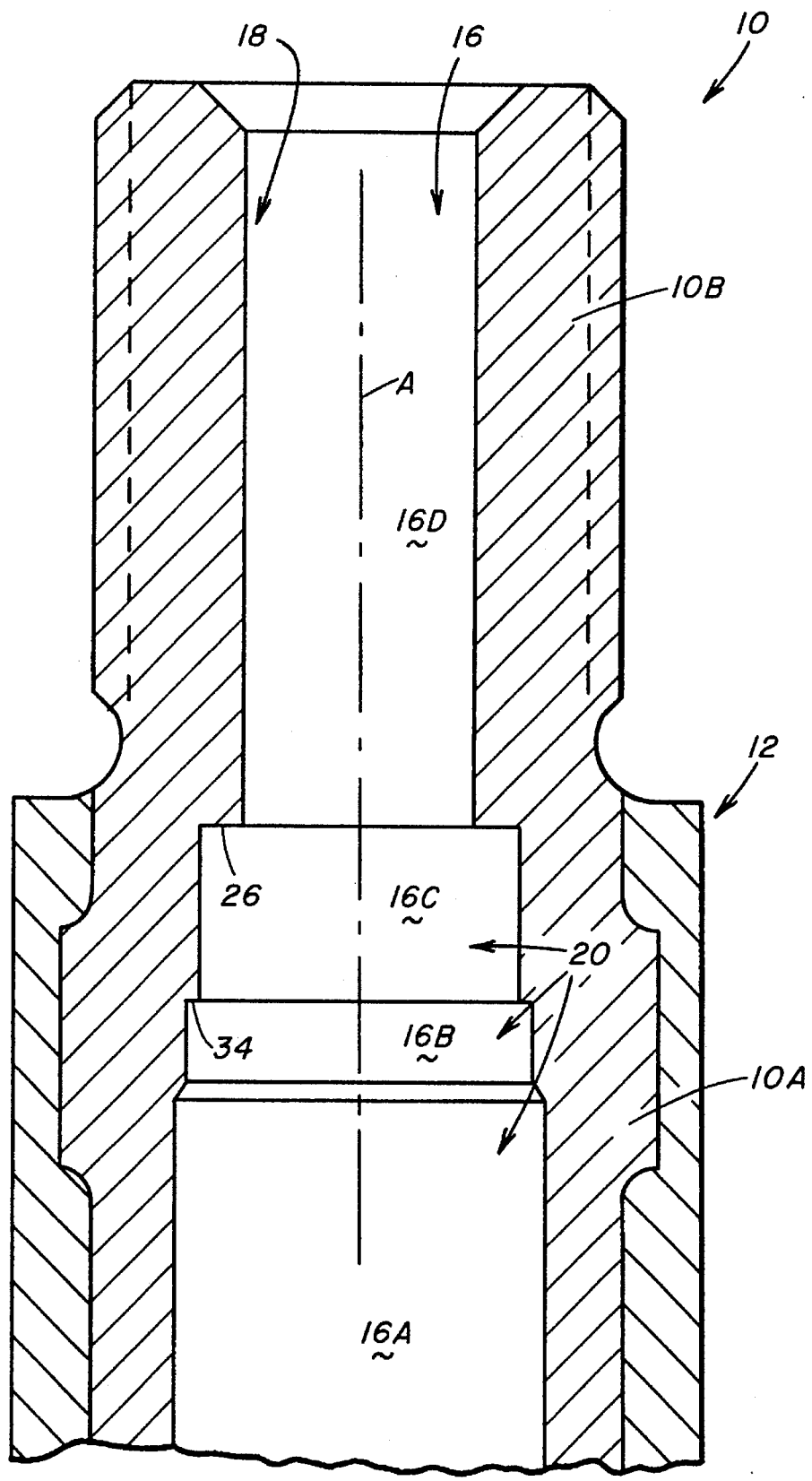
FIG. 1 is a longitudinal sectional view through the valve body and outer casing of the pneumatic valve assembly of the present invention.
Figure 2:
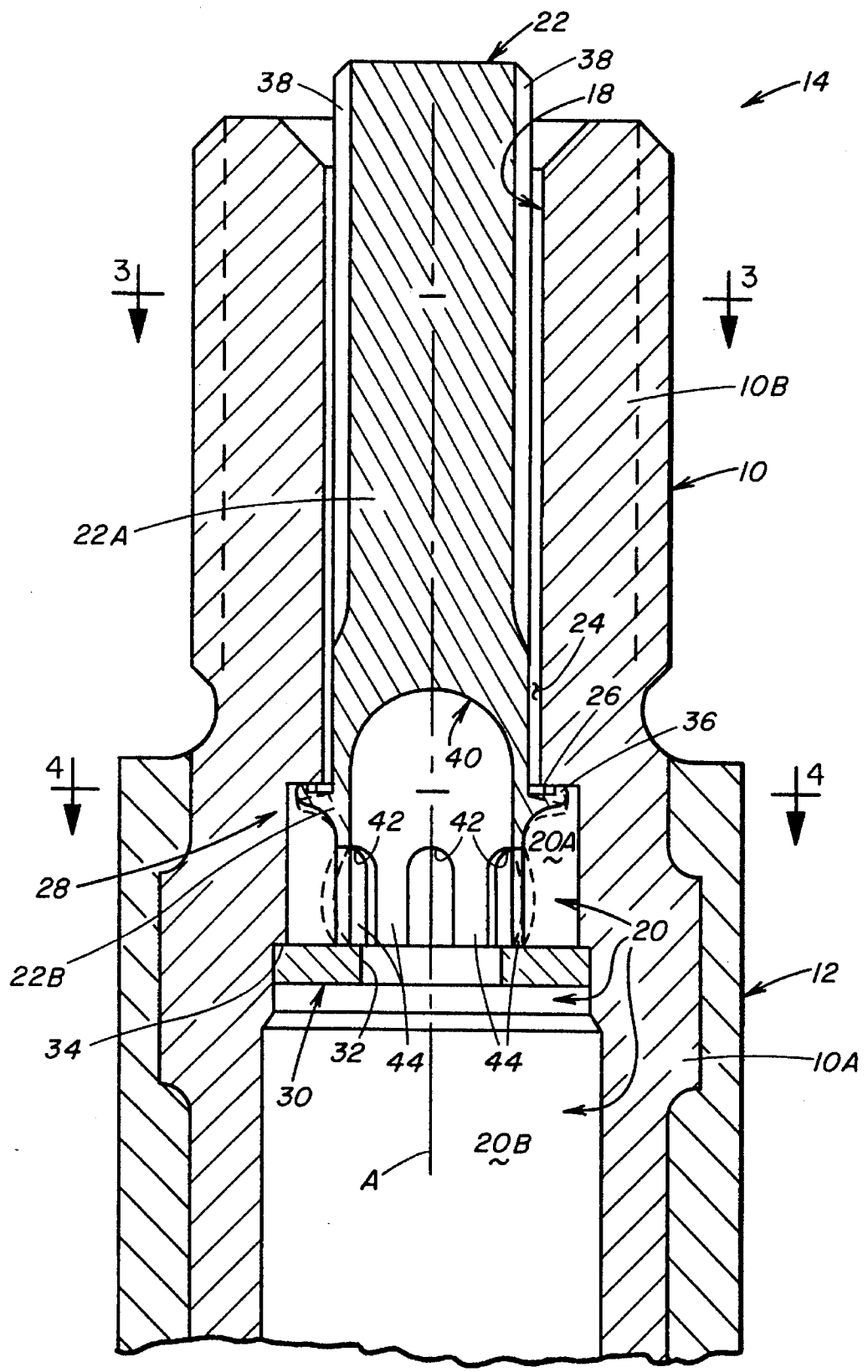
FIG. 2 is a longitudinal sectional view through the valve body, valve stem, annular seal flange, retainer member, and outer casing of the valve assembly of the present invention.

Referring to the drawings and particularly to FIG. 1, there is illustrated an elongated valve body 10 and an outer casing 12 of a pneumatic tire valve assembly of the present invention, being generally designated 14 and shown in FIG. 2. The valve body 10 is preferably made of a relatively inflexible and non-compressible material, such as hard plastic or brass. The outer casing 12, made of a flexible material, such as butyl rubber, is mounted about and supports the valve body 10 at an inner portion 10A thereof such that an outer portion 10B extends outwardly from the outer casing 12. A central bore, generally designated 16, extends through the inner and outer portions 10A, 10B of the valve body 10. The central bore 16 has four distinct sections of varying diameter: an innermost section 16A, a second section 16B, a third section 16C, and an outermost section 16D. The diameter of the innermost section 16A is the greatest, the diameter of the second section 16B is less than that of the innermost section 16A, the diameter of the third section 16C is less than that of the second section 16B, and the diameter of the outermost section 16D is the least. The outermost section 16D of the central bore 16 constitutes an interior outer central passageway 18 through the outer portion 10B of the valve body 10, whereas the innermost, second and third sections 16A, 16B and 16C together constitute an interior inner central cavity 20 through the inner portion 10A of the valve body 10 which is larger in diameter than the outer central passageway 18 while being arranged tandemly and coaxially therewith.

Figure 3:
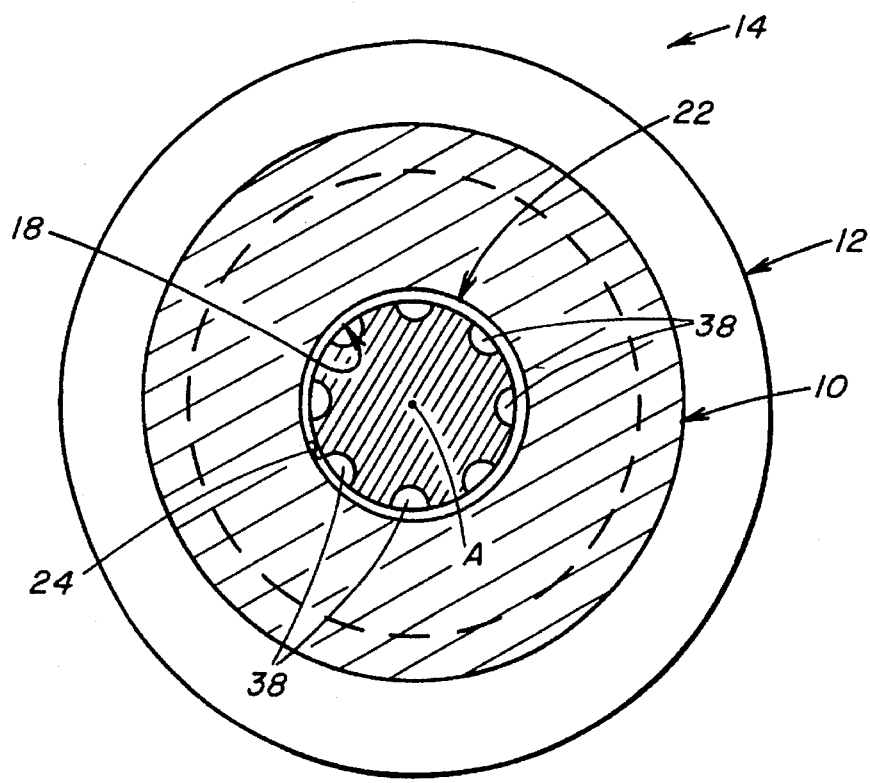
FIG. 3 is a cross-sectional view of the valve body and valve stem of the valve assembly taken along line 3—3 of FIG. 2.
Figure 4:
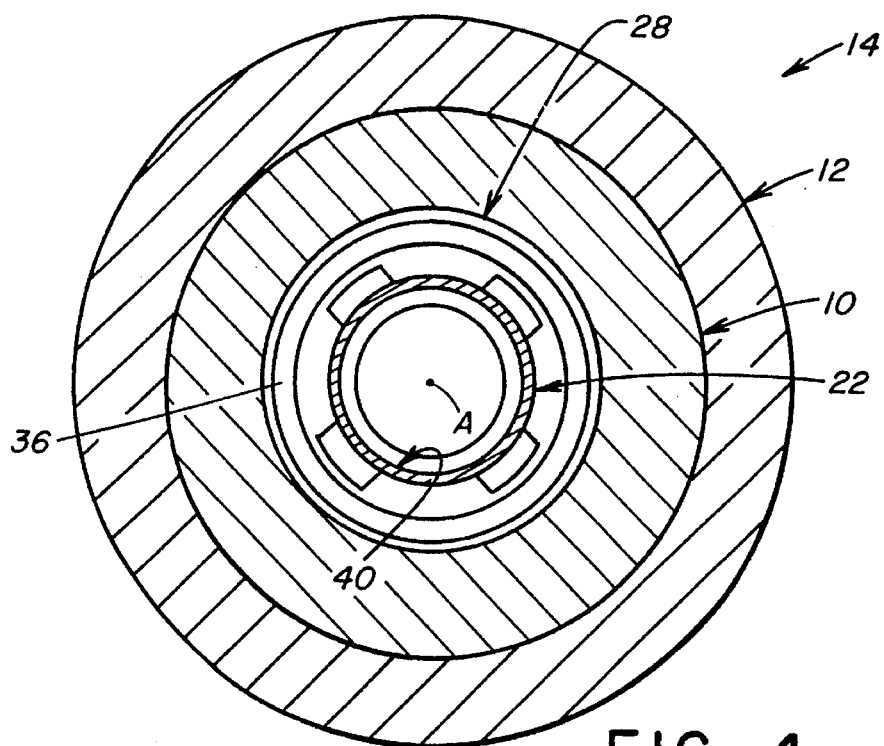
FIG. 4 is cross-sectional view of the valve body, valve stem, annular seal flange, and outer casing of the valve assembly taken along line 4—4 of FIG. 2.

Referring now to FIGS. 2–4, in addition to the valve body 10 and outer casing 12, the pneumatic valve assembly 14 also includes an elongated valve stem 22. The valve stem 22, preferably made of a relatively flexible and compressible material such as neoprene or silicone rubber, is disposed within the outermost section 16D and third section 16C of the central bore 16 of the valve body 10. More particularly, the valve stem 22 has an outer axial portion 22A extending through the outer central passageway 18 of the outer portion 10B of the valve body 10 and an inner axial portion 22B connected at an outer end thereof to an inner end of the outer axial portion 22A. The valve stem 22 is smaller in diameter than the outer central passageway 18 so as to define an annular channel 24 therebetween. The valve body 10 has an interior annular shoulder defining a seal surface 26 between the outermost section 16D and third section 16C of the central bore 16 or, in other words, at the outer end of the inner central cavity 20 and surrounding an inner end of the outer central passageway 18. The annular seal surface 26 extends in a plane which extends generally perpendicular to a longitudinal axis A of the central bore 16. The inner axial portion 22B of the valve stem 22 extends past the annular seal surface 26 defined on the valve body 10 and into the inner central cavity 20 of the inner portion 10A of the valve body 10.

The pneumatic valve assembly 14 further includes an annular seal flange 28 on the valve stem 22 and a retainer member 30 supporting the valve stem 22. The retainer member 30 is an annular ring-shaped plate preferably made of a relatively inflexible and non-compressible material, such as hard plastic or brass. The retainer plate 30 has a central aperture 32 and is disposed in the inner central cavity 20 at an axial position displaced inwardly from the annular seal surface 26 on the valve body 10. The retainer plate 30 is press fitted about its peripheral edge with an annular segment of an interior wall in the valve body 10 at the second section 16B of the central bore 16. The retainer member 30 abuts against an annular shoulder 34 formed at the merger of the second and third sections 16B, 16C of the central bore 16 and extends across the inner central cavity 20, dividing the cavity into an outer chamber 20A located adjacent to the annular seal surface 26 and an inner chamber 20B located remote from the annular seal surface 26. At an inner end of the inner axial portion 22B of the valve stem 22, the retainer member 30 engages the valve stem 22 so as to support it within the outer central passageway 18 and inner central cavity 20 of the valve body 10, preventing the valve stem 22 from moving further into the inner chamber 20B of the inner central cavity 20.

The annular seal flange 28 is attached to the valve stem 22. Preferably, the valve stem 22 and annular seal flange 28 are molded together as a one-piece part. The annular seal flange 28 extends about and radially outward from an outer end of the inner axial portion 22B of the valve stem 22. In response to the support of the valve stem 22 provided by the retainer member 30, the annular seal flange 28 is normally disposed in an engaged position against and sealed relationship with the annular seal surface 26 on the valve body 10. In addition, air pressure against an inner side of the annular seal flange 28 presses an annular raised lip 36 formed about an outer peripheral edge on an outer side of the annular seal flange 28 against the annular seal surface 26, as shown in FIG. 2, forming a tight seal therewith.

However, upon inflation of a tire attached to the valve assembly 13, the greater pressure of the air flow delivered via the annular channel 24 to the outer side of the annular seal flange 28 than that impinging on the inner side of the seal flange 28 causes the annular seal flange 28 to deform or bend and deflect away from the annular seal surface 26 to the displaced position and unsealed relationship, as shown in dashed outline form in FIG. 2, so as to permit the flow of pressurized air to pass between the annular seal surface 26 and annular seal flange 28 and into the outer chamber 20A of the inner central cavity 20 of the valve body 10. The valve stem 22, restrained by the retainer member 30, does not move axially during inflation.

The annular channel 24 is of an area of sufficient size as to preclude flow of pressurized air at high velocity across the annular seal surface 26 and flange 28, thereby preventing erosion of the seal surface 26 and flange 28. The valve stem 22 also has a plurality of grooves 38 formed in the outer axial portion 22A thereof being spaced circumferentially about the valve stem 22 from one another and extending longitudinally along the valve stem 22 from the outer end thereof which protrudes beyond the outer end of the valve body 10. The grooves 38, which are preferably of semicircular shape in cross-section, facilitate the even or uniform distribution of the flow of pressurized air against the outer side of the annular seal flange 28 during inflation.

During inflation, the flow of pressurized air past the deflected annular seal flange 28 enters the outer chamber 20A of the inner central cavity 20. Means in the form of a concavity 40 defined in the inner axial portion 22B and extending into the inner end of the outer axial portion 22A and a plurality of arched slits or passages 42 defined about the periphery of the inner axial portion 22B of the valve stem 22 provide communication between the outer chamber 20A of the inner central cavity 20 and the inner chamber 20B thereof via the central aperture 32 in the retainer plate 30. The pressurized air flows from the outer chamber 20A to the inner chamber 20B of the inner central cavity 20 via the passages 42 and concavity 40.

In order to facilitate deflation of a tire connected to the valve assembly 14, the passages 42 and concavity 40 define a plurality of circumferentially-spaced legs 44 about the inner axial portion 22B of the valve stem 22 extending to the inner end thereof. The removal of the material to form the legs 44 in the inner axial portion 22B of the valve stem 22 reduces the strength in the inner axial portion sufficiently enough to cause the legs 44 to buckle and deform so as to permit slight axial movement of the valve stem 22 inwardly relative to the valve body 10 in response to application of force, such as by a user's finger, on the outermost portion of the valve stem 18. Such slight inward axial movement of the valve stem 22 displaces the annular seal flange 28 away from the annular seal surface 26 sufficiently to permit outward flow of pressurized air therebetween from the inner central cavity 20 outward through the annular channel 24 of the outer central passageway 18, allowing deflation of the tire to occur.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. An pneumatic valve assembly for use to deliver and exhaust flow of pressurized air to and from an inflatable body, said pneumatic valve assembly comprising:

(a) an elongated valve body having an interior outer central passageway and an interior inner central cavity formed in said body and extending in coaxial relationship with one another, said cavity being larger in diameter than said passageway, said cavity at an outer end thereof communicating with said passageway at an inner end of said passageway, said valve body having an interior annular seal surface defined thereon at said outer end of said cavity and surrounding said inner end of said passageway;

(b) an elongated valve stem having an outer axial portion disposed through said passageway of said valve body and movable axially relative to said valve body, said valve stem having an inner axial portion connected at an outer end thereof to said outer axial portion at an inner end thereof, said inner axial portion extending past said annular seal surface defined on said valve body and into said cavity of said valve body, said valve stem being smaller in diameter than said outer central passageway of said valve body so as to define an annular channel therebetween;

(c) a retainer member disposed in said inner central cavity of said valve body and displaced from said annular seal surface on said valve body, said retainer member being engaged with an inner end of said inner axial portion of said valve stem so as to support said valve stem within said outer central passageway and inner central cavity of said valve body;

(d) an annular seal flange attached to and extending about and radially outward from an outer end of said inner axial portion of said valve stem, said annular seal flange, in response to said support of said valve stem by said retainer member, being normally disposed in an engaged position against and sealed relationship with said annular seal surface in said valve body and having an outer side facing towards said annular channel between said valve body and valve stem, said annular seal flange, in response to delivery of a flow of pressurized air through said channel and against said outer side of said annular seal flange, being bendable to a displaced position away from and unsealed relationship with said annular seal surface so as to permit said flow of pressurized air to pass between said annular seal surface and said annular seal flange and into said outer end of said inner central cavity of said valve body, said annular seal flange being movable away from said annular seal surface upon application of pressure on an outward end of said valve stem so as to move said valve stem relative to said valve body toward said retainer member and permit flow of pressurized air between said annular seal surface and said annular seal flange from said outer chamber of said inner central cavity and into said annular channel between said valve body and valve stem; and (e) means defining at least one aperture in at least one of said retainer member and said inner axial portion of said valve stem to permit said flow of pressurized air to pass through said aperture means through said cavity;

(f) said inner end of said inner axial portion of said valve stem including a plurality of legs being circumferentially spaced apart and deformable so as to permit said axial movement of said valve stem relative to said valve body and displacement of said annular seal flange away from said annular seal surface and thereby permit outward flow of pressurized air therebetween from said inner central cavity in response to said application of pressure on said outer end of said valve stem.

2. The assembly of claim 1 further comprising:

a plurality of grooves formed on an outer surface of said valve stem extending from an outer end thereof inwardly toward said inner end thereof, said grooves being circumferentially spaced from one another about said outer surface of said valve stem so as to facilitate a uniform distribution of the flow of pressurized air against said outer side of said annular seal flange.

3. The assembly of claim 2 wherein each of said grooves is semicircular in cross-section.

4. The assembly of claim 1 wherein said valve body is made of a relatively inflexible and incompressible material.

5. The assembly of claim 1 wherein said retainer member is made of a relatively inflexible and incompressible material.

6. The assembly of claim 1 wherein said valve stem and annular seal flange are a one-piece molded part.

7. The assembly of claim 1 wherein said annular seal flange has an annular raised lip formed about an outer peripheral edge of said flange.

8. The assembly of claim 1 wherein said aperture defining means includes a plurality of passages defined through said inner end of said inner axial portion of said valve stem.

9. The assembly of claim 8 wherein said legs are spaced apart so as to form said passages therethrough.

10. The assembly of claim 8 wherein said retainer member is an annular plate fitted about a peripheral edge with an annular segment of an interior wall in said valve body defining said inner central cavity, said plate dividing said inner central cavity into an outer chamber adjacent to said annular seal surface and an inner chamber remote from said annular seal surface, said plate having a central opening defined therethrough communicating between said passages of said inner end of said inner axial portion and said inner chamber of said cavity.

11. The assembly of claim 10 wherein said annular segment of said interior wall of said valve body defines an annular shoulder abutted by said annular plate.

12. The assembly of claim 10 wherein said annular plate is press fitted about said peripheral edge thereof with said annular wall segment in said valve.

13. The assembly of claim 1 further comprising:
an outer casing surrounding and supporting an inner axial portion of said valve body.

14. An pneumatic valve assembly for use to deliver and exhaust flow of pressurized air to and from an inflatable body, said pneumatic valve assembly comprising:

(a) an elongated valve body having an interior outer central passageway and an interior inner central cavity formed in said body and extending in coaxial relationship with one another, said cavity being larger in diameter than said passageway, said cavity at an outer end thereof communicating with said passageway at an inner end of said passageway, said valve body having an interior annular seal surface defined thereon at said outer end of said cavity and surrounding said inner end of said passageway;

(b) an elongated valve stem having an outer axial portion disposed through said passageway of said valve body and movable axially relative to said valve body, said valve stem having an inner axial portion connected at an outer end thereof to said outer axial portion at an inner end thereof, said inner axial portion extending past said annular seal surface defined on said valve body and into said cavity of said valve body, said valve stem being smaller in diameter than said outer central passageway of said valve body so as to define an annular channel therebetween;

(c) a retainer member disposed in said inner central cavity of said valve body and displaced from said annular seal surface on said valve body, said retainer member being engaged with an inner end of said inner axial portion of said valve stem so as to support said valve stem within said outer central passageway and inner central cavity of said valve body;

(d) means attached to and extending about an outer end of said inner axial portion of said valve stem for sealing with said annular seal surface in said valve body to prevent flow of pressurized air from said inner central cavity into said annular channel between said valve body and said valve stem, said sealing means, in response to delivery of a flow of pressurized air through said channel, being displaceable away from said annular seal surface so as to permit said flow of pressurized air into said inner central cavity of said valve body, said sealing means being movable away from said annular seal surface upon application of pressure on an outward end of said valve stem so as to move said valve stem relative to said valve body toward said retainer member and permit flow of pressurized air between said annular seal surface and said sealing means from said outer chamber of said inner central cavity and into said annular channel between said valve body and valve stem;

(e) means defining at least one aperture in at least one of said retainer member and said inner axial portion of said valve stem to permit said flow of pressurized air to pass via said aperture means into said inner central cavity; and (f) a plurality of grooves formed on an outer surface of said valve stem extending from an outer end thereof inwardly toward said inner end thereof, said grooves being circumferentially spaced from one another about said outer surface of said valve stem so as to facilitate a uniform distribution of the flow of pressurized air to said sealing means;

(g) said inner end of said inner axial portion of said valve stem including a plurality of legs being circumferentially spaced apart and deformable so as to permit axial movement of said valve stem relative to said valve body and displacement of said sealing means away from said annular seal surface and thereby permit outward flow of pressurized air therebetween from said inner central cavity in response to said application of pressure on said outer end of said valve stem.

15. The assembly of claim 14 wherein each of said grooves is semicircular in cross-section.

16. The assembly of claim 14 wherein said aperture defining means includes a plurality of passages defined through said inner end of said inner axial portion of said valve stem.

17. The assembly of claim 16 wherein said legs are spaced apart so as to form said passages therethrough.

18. The assembly of claim 16 wherein said retainer member is an annular plate fitted about a peripheral edge with an annular segment of an interior wall in said valve body defining said inner central cavity, said plate dividing said inner central cavity into an outer chamber adjacent to said annular seal surface and an inner chamber remote from said annular seal surface, said plate having a central opening defined therethrough communicating between said passages of said inner end of said inner axial portion and said inner chamber of said cavity.

* * * * *